[11] 3,952,217
[45] Apr. 20, 1976

[54] DRIVE FOR SCANNING MIRROR
[75] Inventor: John L. Rawlings, Westport, Conn.
[73] Assignee: The Perkin-Elmer Corporation, Norwalk, Conn.
[22] Filed: Sept. 23, 1974
[21] Appl. No.: 508,045

Related U.S. Application Data
[63] Continuation-in-part of Ser. No. 400,619, Sept. 25, 1973, abandoned.

[52] U.S. Cl. ................................ 310/36; 310/115; 310/116; 350/6; 178/7.6; 335/230
[51] Int. Cl.² ....................................... H02K 33/12
[58] Field of Search .................... 178/7.6; 350/6; 310/36–39, 115–120; 335/229, 230, 272, 274

[56] References Cited
UNITED STATES PATENTS

| | | | |
|---|---|---|---|
| 1,918,358 | 7/1933 | Walton | 310/116 X |
| 2,034,583 | 3/1936 | Koch | 350/6 X |
| 2,673,318 | 3/1954 | Beitz | 310/38 X |
| 3,130,591 | 4/1964 | Paddick et al. | 310/36 X |
| 3,234,844 | 2/1966 | Fain et al. | 350/6 |
| 3,453,464 | 7/1969 | Baker, Jr. | 310/36 |
| 3,491,258 | 1/1970 | Siefert | 310/36 |
| 3,642,344 | 2/1972 | Corker | 310/36 X |
| 3,671,766 | 6/1972 | Howe | 310/39 |
| 3,678,308 | 7/1972 | Howe | 310/36 |
| 3,847,466 | 11/1974 | Forse | 350/6 X |

*Primary Examiner*—Donovan F. Duggan
*Attorney, Agent, or Firm*—S. A. Giarratana; F. L. Masselle; J. K. Conant

[57] ABSTRACT

A drive system for causing a relatively massive scanning element, such as a mirror, to rotate back and forth about a scan axis, with minimum disturbance of the space vehicle which carries it, includes a counterbalance which oscillates about an axis parallel to axis of the element in the opposite direction and 180° out of phase so that the net angular momentum of the system is zero. One or more buffer springs attached to the element encounter limit stops on the counterbalance, or vice versa, at the ends of the scan to stop and reverse the motions of both the element and counterbalance without reaction on the supporting members. For a given rate of scan, the energy of the system remains substantially constant but changes twice per cycle from kinetic energy during the coasting period (i.e., between contacts with the springs) to potential energy stored in the springs during reversal. Proper attention to the design of the bearings and of the springs and stops ensures minimum loss of energy. An electromagnetic torque motor is provided to drive the mirror, and react on the counterbalance, to make up energy losses as required and to initiate the oscillation. A second torque motor may be provided to drive the counterbalance and react on the supporting structure to change the mean angular position of the mirror with respect to the support.

7 Claims, 5 Drawing Figures

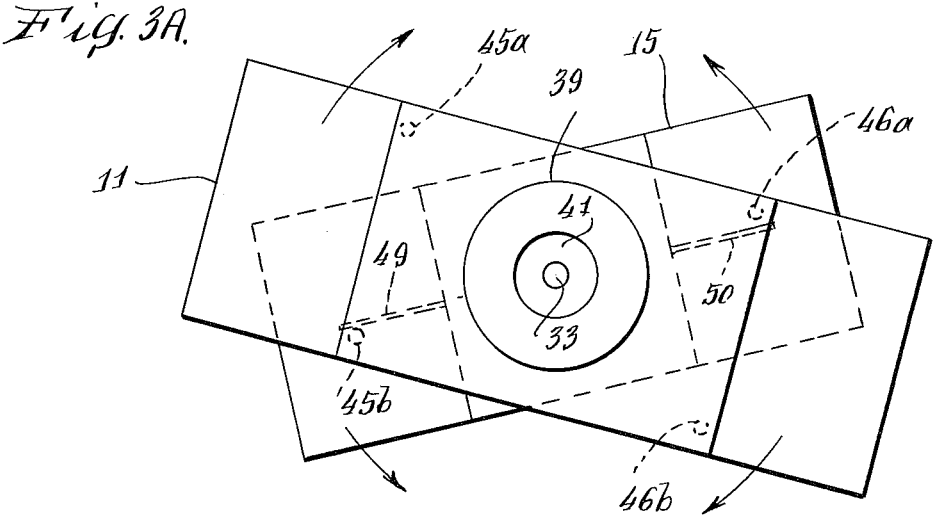
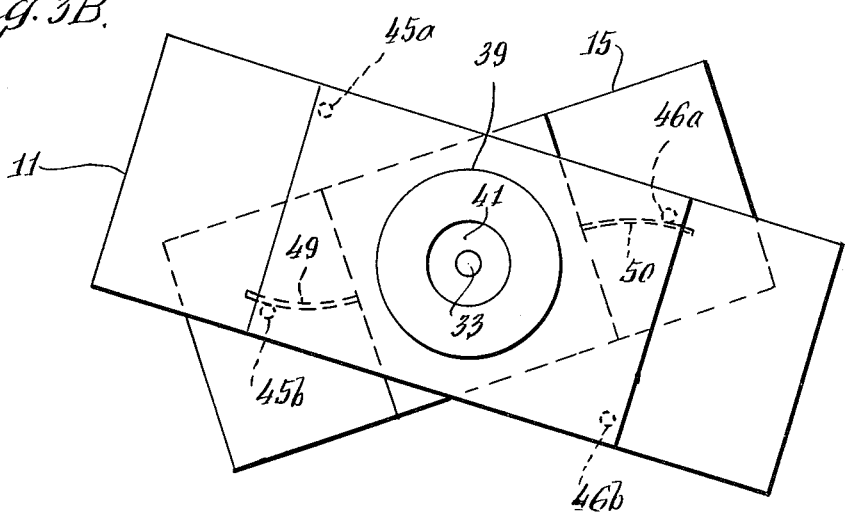
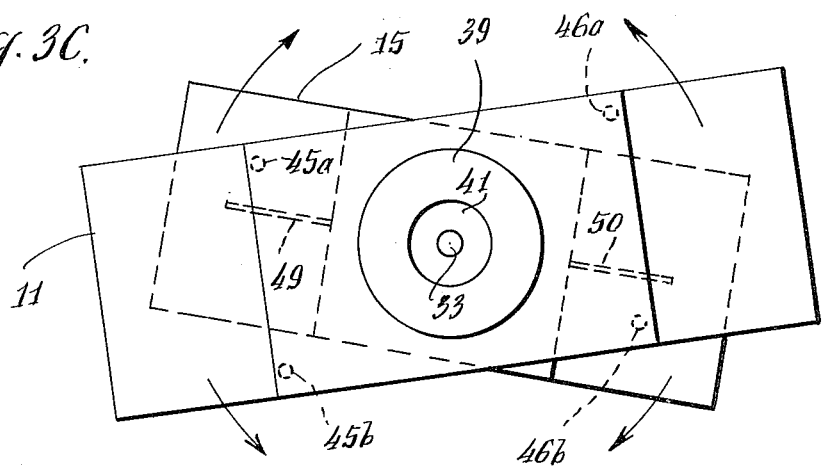

DRIVE FOR SCANNING MIRROR

This is a continuation-in-part of copending application Ser. No. 400,619 filed Sept. 25, 1973, now abandoned.

BACKGROUND OF THE INVENTION

It is known to oscillate a scanning mirror about a scan axis at substantially uniform velocity. Such a system is disclosed, for example, in U.S. Pat. No. 3,671,766 of Howe. However, when such a mirror is carried by a space vehicle, the problem of absorbing its momentum and reversing its direction results in undesirable forces acting on the vehicle which may alter its attitude. It will also be apparent that, in such an application, it is desirable that there be minimum reversal time, minimum power consumption, and maximum reliability.

Accordingly, it is a principal object of the present invention to provide a system for driving a scanning element such as a mirror in such a manner as to cause minimum disturbance to the supporting vehicle.

Other objects are to provide such a system wherein the scanning element has a substantially uniform velocity with minimum reversal time, minimum power consumption, and maximum reliability. The manner in which these objects are achieved will be more apparent from the following description and appended claims.

SUMMARY OF THE INVENTION

An assembly carrying a scanning element such as a mirror, a radar antenna, a telescope, etc. is mounted on a base structure by means of bearings, such as flexure bearings, which define a scan axis of rotation of the element. A counterbalance is supported for rotation about an axis parallel to the axis of rotation of the element and one or more springs on either the element assembly or the counterbalance assembly encounter stops on the other of the element or counterweight assembly for limiting relative rotation therebetween. Power is applied initially to cause the mirror element and the counterbalance to oscillate in opposite directions. Thereafter the elements for the most part coast through successive scanning cycles under their own momentum along with the action of the springs and stops which act to reverse and continue the oscillations, but power is available to be applied as necessary to make up energy losses, to adjust the scanning rate and to correct the phase relationship.

In the following description the scanning element is described as being a mirror, but it will be understood that the invention is useful in connection with other types of scanning elements also.

BRIEF DESCRIPTION OF THE DRAWINGS

The invention is described below with reference to an illustrative embodiment shown in the accompanying drawings in which:

FIG. 3a, 3b, and 3c illustrate schematically three successive positions of the mirror element and counterbalance of the system of this invention during a portion of a scanning cycle; specifically FIG. 3a shows their relative positions and directions of movement near an end of one scan, FIG. 3b shows their relative positions at one end of the scan just at the commencement of movement of the reverse directions, and FIG. 3c shows their relative positions and directions of movement in the reverse directions.

DETAILED DESCRIPTION

Figure 1:
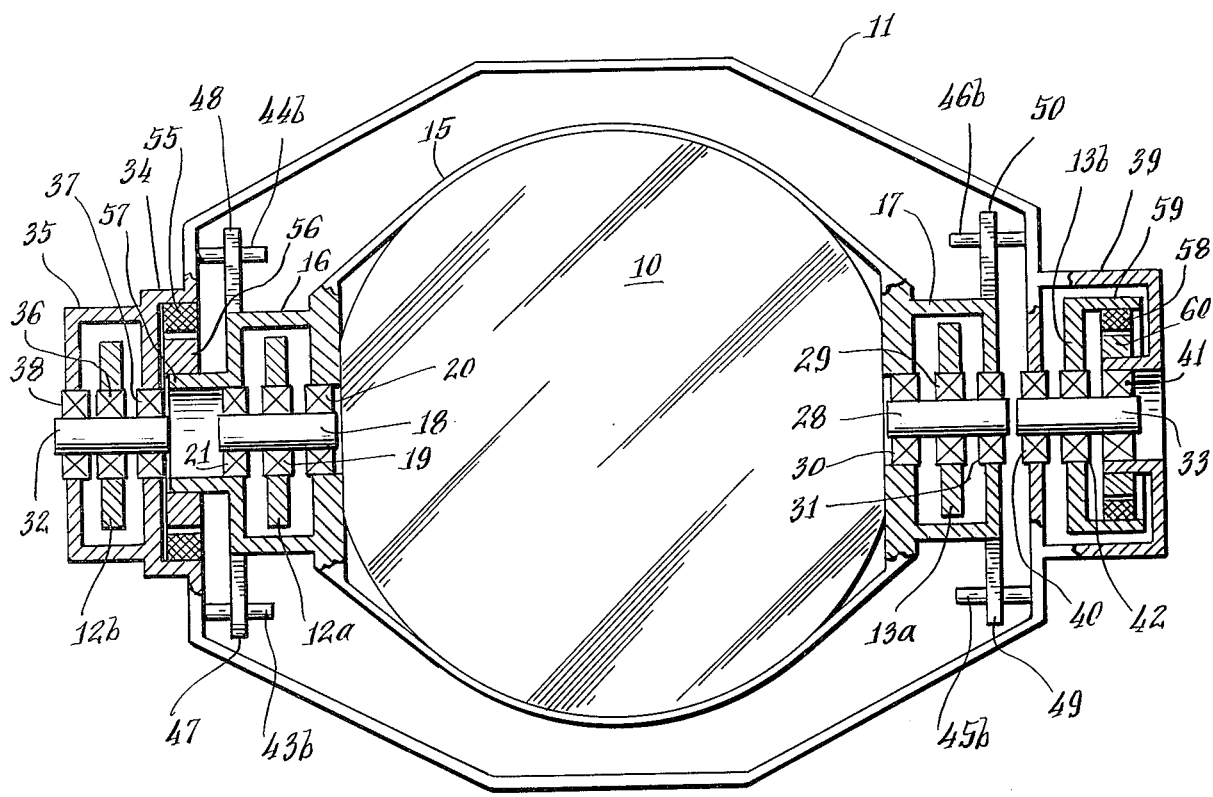
FIG. 1 is a top plan view, partly in section, of a mirror drive system in accordance with the invention.
Figure 2:
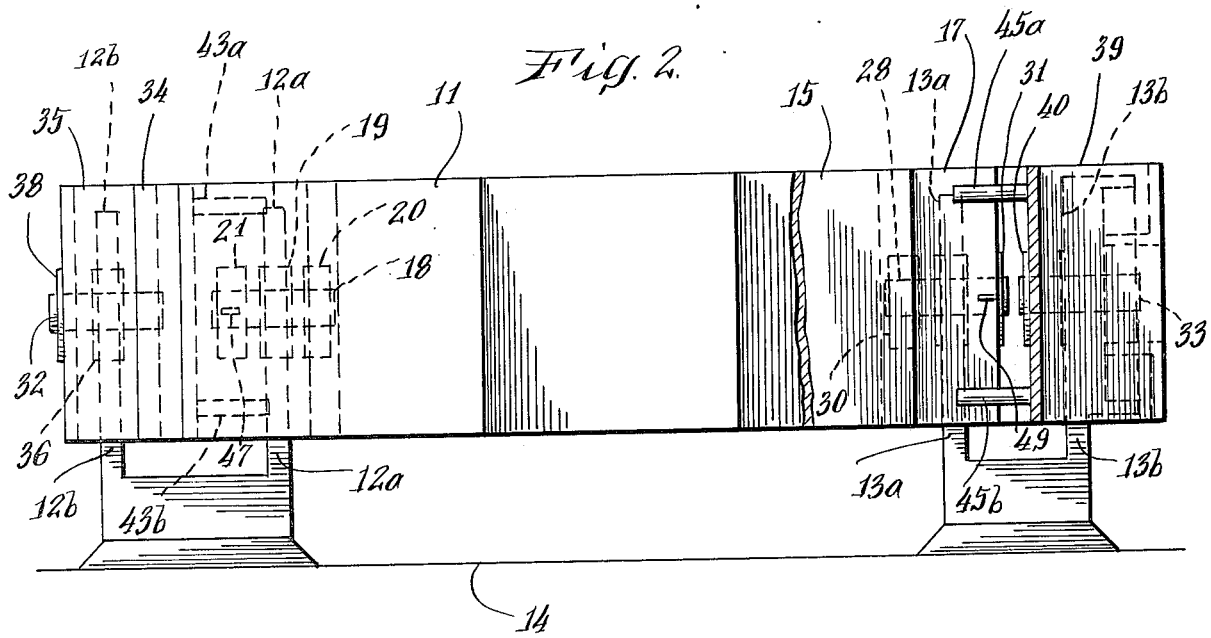
FIG. 2 is a side elevational view, partly broken away, of the system of FIG. 1.

Referring to FIGS. 1 and 2 a scanning assembly in accordance with this invention consists of a scanning element, a mirror 10 in the embodiment shown, and a counterbalance 11 therefor, both being supported for independent rotation about parallel axis on a pair of bifurcated brackets 12 and 13 that are mounted on a suitable base 14, such as a portion of space vehicle.

The mirror 10 is carried in a mounting frame 15 which has a hollow box-like portion 16 projecting from one end, the left end in FIG. 1, and another generally similar, box-like portion 17 projecting from the other end which is the right end in FIG. 1. The bottoms of the mirror frame portions 16 and 17 are open for the bifuraction 12a of brackt 12 and a bifurcation 13a respectively, to be received therein. The left end of the frame 15 is rotatably supported on the bifurcation 12a by a short shaft 18 which is journalled through the bifurcation 12a by a bearing 19 carried in the bifurcation and which has its end journalled in opposite walls of the mirror frame portion 16 by bearings 20 and 21 that are mounted in the respective walls. The right end of the frame 15 is rotatably supported on the bifurcation 13a by a short shaft 28 which is journalled through the bifurcation 13a by a bearing 29 carried in the bifurcation and which has is ends journalled in opposite walls of the mirror frame portion 17, by bearing 30 and 31 mounted in the respective walls.

The counterbalance 11 in the embodiment illustrated is a generally ring-like element of larger diameter than the mirror frame 15 and surrounding the mirror frame. The counterbalance 11 is mounted for rotation, independently of the mirror frame 15, on an axis which is defined by short shafts 32 and 33, and which is coaxial with the axis of rotation of the frame 15 as defined by the shafts 18 and 28. The axis of the counterbalance must at least be parallel to the axis of the mirror frame, but in order to facilitate construction and to minimize energy losses in the buffer spring and stop pin system subsequently described, it is preferred to have the respective axis coincident, as in the embodiment illustrated in FIGS. 1 and 2.

The left end of the counterbalance 11 has two box-like portions 34 and 35 projecting therefrom, the portion 35 extending outward from the portion 34. The outward portion 35 is open at the bottom and the mounting bracket bifurcation 12b projects up into it for rotatably mounting the left end of the counterbalance on the bifurcation 12b by means of the short shaft 32 which is journalled through the bifurcation 12b by a bearing 36 and which has its ends journalled in the opposite walls of the box-like portion 35 by bearings 37 and 38.

At the right end of the counterbalance 11 a box-like portion 39 projecting therefrom is open at the bottom and the mounting bracket bifurcation 13b extends up into for the right end of the counterbalance to be rotatably supported on the bifurcation 13b by the shaft 33 which has its ends journalled in the opposite walls of the portion 39 by bearings 40 and 41, respectively, and which is journalled through the bifurcation 13b by a bearing 42.

In operaton, as will subsequently be described in more detail, the frame 15 carrying mirror 10 and the counterbalance 11 oscillte in opposite directions 180° out of phase during each scan of the mirror in one direction, and then respectively reverse directions for the scan of the mirror in the other direction. The cyclical reversal of the mirror and counterbalance is achieved by buffer springs (47 to 50, described below) which, during each reversal absorb the kinetic energy of the system, convert it into potential strain energy, and then return it to kinetic energy again. The buffer springs may be mounted on either the mirror frame or counterbalance to cooperate with limit stop pins on either the counterbalance or mirror frame respectively; it does not matter which element carries the spring and which carries the stop pins.

In the embodiment shown, as best seen in FIGS. 1, 2 and 3a there are two pairs of limit stop pins 43a, 43b and 44a, 44b projecting inward from the left end wall of the counterbalance 11, and two pairs, 45a, 45b and 46a, 46b projecting inward from the right end wall of counterbalance 11. The pins of each pair are spaced apart vertically and the two pairs of pins at each end wall of the counterbalance are spaced apart horizontally. The mirror frame 15 carries four leaf springs 47, 48, 49, 50 with the springs 47 and 48 projecting respectively out from opposite side walls of the mirror frame projection 16 at one end of the frame, and the springs 49 and 50 projecting respectively out from opposite side walls of the mirror frame projection 17 at the other end of the frame. These springs extend, between the pairs of pins 43a, 43b, 44a, 44b, 45a, 45b and 46a, 46b respectively, so as to engage one or the other of the pins of each pair at one or the other end of the scan motion in one direction. The system would operate effectively with a single pair of stop pins and a single spring for cooperating therewith, or a single stop pin and a pair of springs spaced apart vertically, but it is believed the provision of four pairs of pins four springs, as illustrated, enhances the smooth and continuous operation with a minimum of additinal power required for correcting, adjusting and maintaining the motion of this part. Means for applying such additional power in the embodiment illustrated is subsequently explained in detail.

In operation, as shown in FIGS. 3a, 3b and 3c, the mirror frame 15, carrying mirror 10, and the counterbalance 11 oscillate in opposite directions, i.e. 180° out-of-phase. The oscillations are started by the motive power, subsequently described to provide the required energy; thereafter the motion of the parts is perpetuated by the operation of motive power to make up for energy losses.

In FIG. 3a the mirror frame 15 is scanning in a counterclockwise directon while the counterbalance 11 rotates in the opposite, clockwise, direction. When the mirror frame 15 reaches the end of its counterclockwise scan, as depicted in FIG. 3b, the buffer springs, 49 and 50 on the mirror frame engage the pins 45b and 46a, respectively, then flex against the pins, as shown, until the energy of the frame 15 and of the counterbalance 11 are transformed into deformation of the springs 49, 50 to the point at which each of the parts stops its rotation, illustrated in FIG. 3b. The mirror frame 15 and counterbalance are then each caused to rotate in the opposite direction under the pressure of the springs, as illustrated in FIG. 3c, in which the mirror frame 15 is now rotating in the clockwise direction and the counterweight in the counterclockwise direction. The end of the mirror scan path in the clockwise direction occurs when the buffer springs 49, 50 engage the other pins, 45a and 46b, of the pairs of pins shown, and the cooperation of the springs with these pins again reverses the directions of rotation of the parts.

The mirror frame 15 and the counterbalance thus in effect "coast" between the times at which the buffer springs engage the stop pins, at the ends of the scan path, and stop the motion and then impell the parts to rotate in the reverse directions respectively.

The length of the scan path of the mirror 10, carried by frame 15, is of course determined by the amount the pins of each pair, 43a, 43b etc., are spaced apart. In the embodiment illustrated the spacing of the pins of each pair, and hence the length of the scan path, is shown as being fixed. If it is desired to be able to change the length of the scan path, the pins of each pair could suitably be mounted for their positions to be moved for adjusting the relative spacing; for example the pins could be carried as movable links mounted on the counterbalance walls and provision could be made by known means for moving the links to new positions, either manually or by remotely controlled power driver mechanisms.

Now referring back to FIG. 1, motive power to be applied as required for maintaining the oscillatory motions of the mirror frame 15 and counterbalance 11, is provided by a D.C. torque motor connected between the mirror frame and counterbalance at the left end of the assembly. This D.C. torque motor consists of a wound stator 55 mounted in the interior of the portion 34 of the counterbalance 11 (at the left end thereof) to be around a rotor 56, which is a permanent magnet, mounted around an annular flange 57 which projects outward from the outer wall of the box-like portion 16 on the left end of the mirror frame 15.

Electric power is applied to the stator coil 55 of the D.C. torque motor from a conventional source not shown such as a small dry cell (eg. 1½ volt) battery, by conventional circuitry, not shown, for starting and stopping the motor and for switching the directions of the generated torque to coincide with the direction in which the mirror frame and counterbalance are rotating. This motor is also used to start the oscillation of the mirror frame and counterbalance for initiating scanning and to stop the oscillation if it is desired to stop the scanning rapidly.

This torque motor may also be employed in conjunction with some form of scan velocity monitor, if it is desired to provide a more sophisticated servo system for accurate control of scan velocity.

A second D.C. torque motor is also preferably provided between the base 14, through mounting bracket 13 at the right, and the counterbalance 11, for changing the mid scan angle of the mirror 10 with respect to the base 14. The scan angle is the angular position of the line normal to to the mirror relative the base 14 when the mirror is at the mid-point of its scan path, and is changed for aiming the scanning assembly relative to the base 14, for selecting the field to be scanned.

This second D.C. torque motor consists of a wound stator 58 mounted within an annular flange 59 that projects outward to the right from the upper end of the mounting bracket bifurcation 13b, at the right end of the counterbalance 11, and a rotor 60, which is an annular permanent magnet, mounted around an annular flange 61 that projects inwardly from the outer end wall of the box-like portion 39 on the right end of the counterbalance 11. Through D.C. torque motors, as described above, are preferred because of their higher efficiency A.C. torque motors could be employed instead, if desired.

In the embodiment illustrated, the mirror frame 15 and counterbalance 11 are shown mounted for rotation by means of conventional shafts, 18, 28, 32, and 33, and associated bearings 19–21, 29–31, 36–38, and 40–42, respectively, which operate quite satisfactorily to accomplish the object of providing a scanning assembly which operates largely by the momentum of the motion of its parts with a minimum supplemental power assist, which need only be applied at intervals for maintaining and/or changing the scan velocity. However, the efficiency and life of the assembly can further be enhanced, and even greater economy of power achieved, by using flexure bearings, such as the flexure bearings of the general type described in U.S. Pat. No. 3,479,107 in place of the shafts 18, 28, 32 and 33 and the conventional bearings associated therewith. If the flexure bearings utilized have neither hysteresis nor spring rate the scan velocity would be absolutely uniform, and in practice the hysteresis can be made very small by proper design and choice of flexure material and flexure bearings have in fact been made with zero spring rate.

What is claimed is:

1. A scanning element assembly comprising:
   a scanning element such as a mirror;
   first bearing means supporting said scanning element for rotation about a scan axis;
   a counterbalance;
   second bearing means supporting said counterbalance for rotation about an axis parallel to the axis of the scanning element;
   buffer spring means on one of the scanning element and counterbalance;
   stop means on the other of the scanning element and counterbalance;
   said stop means and spring means being mounted and spaced to permit a predetermined amount of rotation of the scanning element relative to the counterbalance successively in opposite directions and to engage and reverse the direction of relative rotation when the scanning element has rotated said predetermined amount; and
   power drive means connected to the scanning element and to the counterbalance for initiating rotation of the scanning element in one direction and rotation of the counterbalance in the opposite direction and for applying power as required to continue the rotation of the scanning element and counterbalance at the desired velocity.

2. The scanning element assembly of claim 1 in which the axis of rotation of the scanning element and the axis of rotation of the counterbalance are coincident.

3. The scanning element assembly of claim 1 in which said power drive means is a motor having one main element thereof mounted on one of the scanning element and counterbalance and a second main element, that moves relative to said one main element in operation of the motor, mounted on the other of the scanning element and counterbalance for causing the scanning element and counterbalance to be rotated in opposite directions when the motor is actuated.

4. The scanning element assembly of claim 3 in which said motor is a torque motor having its stator mounted on one of the scanning element and counterbalance, coaxially therewith and having its rotor mounted on the other of the scanning element and counterbalance, coaxially therewith.

5. The scanning element assembly of claim 1 in which the scanning element and the counterbalance are mounted for rotation on a base, and which includes second intermittently operable power drive means connected to the counterbalance and to said base for changing the angular rotation to the counterbalance to the base at a predetermined point along the path of rotation of the counterbalance, as defined by the relative rotation of the scanning element in opposite directions.

6. The scanning element assembly of claim 5 in which said second intermittently operable power drive means is a motor having one main element thereof mounted on one of the counterbalance and the base and a second main element, that moves relative to said one main element in operation of the motor, mounted on the other of the counterbalance and the base.

7. The scanning element assembly of claim 6 in which said motor is a torque motor having its stator mounted on one of the counterbalance and the base and its rotor mounted on the other of the counterbalance and the base, said stator and rotor being mounted coaxially with the axis of the counterbalance.

* * * * *